(12) United States Patent
Chen et al.

(10) Patent No.: US 11,100,709 B2
(45) Date of Patent: Aug. 24, 2021

(54) METHOD, APPARATUS AND DEVICE FOR PROCESSING DEFORMATION OF VIRTUAL OBJECT, AND STORAGE MEDIUM

(71) Applicant: ZHEJIANG SENSETIME TECHNOLOGY DEVELOPMENT CO., LTD., Zhejiang (CN)

(72) Inventors: Chengju Chen, Hangzhou (CN); Xinglun Liang, Hangzhou (CN); Renzhi Wang, Hangzhou (CN); Guofeng Zhang, Hangzhou (CN)

(73) Assignee: ZHEJIANG SENSETIME TECHNOLOGY DEVELOPMENT CO., LTD, Hangzhou (CN)

( * ) Notice: Subject to any disclaimer, the term of this patent is extended or adjusted under 35 U.S.C. 154(b) by 0 days.

(21) Appl. No.: 17/079,980

(22) Filed: Oct. 26, 2020

(65) Prior Publication Data
US 2021/0043000 A1 Feb. 11, 2021

Related U.S. Application Data

(63) Continuation of application No. PCT/CN2020/074705, filed on Feb. 11, 2020.

(30) Foreign Application Priority Data

May 15, 2019 (CN) .......................... 201910403876.3

(51) Int. Cl.
*G06T 17/20* (2006.01)
*G06T 15/00* (2011.01)
(Continued)

(52) U.S. Cl.
CPC ............ *G06T 17/20* (2013.01); *G06T 15/005* (2013.01); *G06T 19/006* (2013.01); *G06T 19/20* (2013.01)

(58) Field of Classification Search
None
See application file for complete search history.

(56) References Cited

FOREIGN PATENT DOCUMENTS

| CN | 101071514 A | 11/2007 |
| CN | 101783026 A | 7/2010 |

(Continued)

OTHER PUBLICATIONS

International Search Report in the international application No. PCT/CN2020/074705, dated Apr. 17, 2020, 2 pgs.

(Continued)

*Primary Examiner* — Robert J Craddock
(74) *Attorney, Agent, or Firm* — Cooper Legal Group, LLC

(57) ABSTRACT

A method and apparatus for processing a virtual object, a device, and a storage medium are provided. The method for processing a virtual object includes: acquiring first bone parameters and first blend deformation data corresponding to a preset three-dimensional virtual object model comprising a plurality of bones, the first blend deformation data indicating a degree of deformation of the preset three-dimensional virtual object; acquiring second bone parameters corresponding to a target three-dimensional virtual object model, and determining a transformation relationship of the second bone parameters with the first bone parameters; and determining second blend deformation data corresponding to the target three-dimensional virtual object model, according to the transformation relationship of the second bone parameters with the first bone parameters, and the first blend deformation data.

20 Claims, 20 Drawing Sheets

(51) Int. Cl.
  *G06T 19/00* (2011.01)
  *G06T 19/20* (2011.01)

(56) References Cited

FOREIGN PATENT DOCUMENTS

| CN | 101968891 A | 2/2011 |
|---|---|---|
| CN | 102054296 A | 5/2011 |
| CN | 102157010 A | 8/2011 |
| CN | 101833788 B | 9/2011 |
| CN | 104376594 A | 2/2015 |
| CN | 104537630 A | 4/2015 |
| CN | 104978764 A | 10/2015 |
| CN | 105654537 A | 6/2016 |
| CN | 105900144 A | 8/2016 |
| CN | 106846499 A | 6/2017 |
| CN | 107146199 A | 9/2017 |
| CN | 107633542 A | 1/2018 |
| CN | 107705365 A | 2/2018 |
| CN | 109191570 A | 1/2019 |
| CN | 109395390 A | 3/2019 |
| CN | 109711335 A | 5/2019 |
| CN | 109727302 A | 5/2019 |
| CN | 110111247 A | 8/2019 |

OTHER PUBLICATIONS

"Interactive Facial Animation System"; Jan. 2018; Cai Ruitao; China's outstanding master's thesis full-text database Information Technology Series (monthly), vol. 2018, No. 01, 15, 77 pgs.
"Facial Expression Animation Based on Kinect and Mesh Geometry Deformation"; Dec. 2017; Mandun Zhang, Jianglei Huo, Xinyuan Shan, Xiaofang Wang and Hongtao Wu; Computer Engineering and Applications, vol. 53, No. 14, pp. 172-177.

METHOD, APPARATUS AND DEVICE FOR PROCESSING DEFORMATION OF VIRTUAL OBJECT, AND STORAGE MEDIUM

CROSS-REFERENCE TO RELATED APPLICATIONS

This application is a continuation of International Application No. PCT/CN2020/074705, filed on Feb. 11, 2020, which claims priority to Chinese patent application No. 201910403876.3, filed on May 15, 2019. The contents of International Application No. PCT/CN2020/074705 and Chinese patent application No. 201910403876.3 are hereby incorporated by reference in their entireties.

TECHNICAL FIELD

The disclosure relates to the field of virtual reality, and more particularly, to a method, apparatus and device for processing deformation of a virtual object, and a storage medium.

BACKGROUND

Driven by the game industry and virtual reality, digital virtual characters have been widely used. Virtual characters have evolved from simplex virtual characters to characters autonomously designed by players, including figures with unique personalities, automatically running expressions, and the like.

At present, after a user customizes a virtual object model by his/her own, expressions of the virtual object are usually driven by data of an original blendshape. If the customized model is largely deformed, there will be large errors if still using the original blend deformation data to run the expressions.

SUMMARY

The purpose of one or more embodiments of the disclosure is to provide a method, apparatus and device for processing deformation of a virtual object, and a storage medium.

In a first aspect, provided is a method for processing deformation of a virtual object, including: acquiring first bone parameters and first blend deformation data corresponding to a preset three-dimensional virtual object model comprising a plurality of bones, the first blend deformation data indicating a degree of deformation of the preset three-dimensional virtual object acquiring second bone parameters corresponding to a target three-dimensional virtual object model, and determining a transformation relationship of the second bone parameters with the first bone parameters; and determining second blend deformation data corresponding to the target three-dimensional virtual object model, according to the transformation relationship of the second bone parameters with the first bone parameters, and the first blend deformation data.

In a second aspect, provided is an apparatus for processing deformation of a virtual object, including: a first acquisition unit, configured to acquire first bone parameters and first blend deformation data corresponding to a preset three-dimensional virtual object model comprising a plurality of bones, the first blend deformation data indicating a degree of deformation of the preset three-dimensional virtual object; a second acquisition unit, configured to acquire second bone parameters corresponding to a target three-dimensional virtual object model, and determine a transformation relationship of the second bone parameters with the first bone parameters; and a determination unit, configured to determine second blend deformation data corresponding to the target three-dimensional virtual object model, according to the transformation relationship of the second bone parameters with the first bone parameters, and the first blend deformation data.

In a third aspect, provided is a device for processing deformation of a virtual object, comprising: a processor; and a memory configured to store instructions which, when being executed by the processor, cause the processor to carry out the following: acquiring first bone parameters and first blend deformation data corresponding to a preset three-dimensional virtual object model comprising a plurality of bones, the first blend deformation data indicating a degree of deformation of the preset three-dimensional virtual object; acquiring second bone parameters corresponding to a target three-dimensional virtual object model, and determine a transformation relationship of the second bone parameters with the first bone parameters; and determining second blend deformation data corresponding to the target three-dimensional virtual object model, according to the transformation relationship of the second bone parameters with the first bone parameters, and the first blend deformation data.

In a fourth aspect, provided is a non-transitory computer-readable storage medium having stored thereon computer programs that, when being executed by a computer, cause the computer to carry out the following: acquiring first bone parameters and first blend deformation data corresponding to a preset three-dimensional virtual object model comprising a plurality of bones, the first blend deformation data indicating a degree of deformation of the preset three-dimensional virtual object; acquiring second bone parameters corresponding to a target three-dimensional virtual object model, and determine a transformation relationship of the second bone parameters with the first bone parameters; and determining second blend deformation data corresponding to the target three-dimensional virtual object model, according to the transformation relationship of the second bone parameters with the first bone parameters, and the first blend deformation data.

BRIEF DESCRIPTION OF THE DRAWINGS

In order to illustrate the technical solutions of one or more embodiments of the disclosure more clearly, the drawings to be used in the embodiments will be briefly introduced below. It is apparent that the drawings described below correspond to only some embodiments disclosed in the specification. Those skilled in the art can also obtain other drawings based on these drawings without paying creative efforts.

DETAILED DESCRIPTION

In order to enable those skilled in the art to better understand the technical solutions in one or more embodiments of the disclosure, the technical solutions in one or more embodiments of the disclosure will be described clearly and completely below in conjunction with the drawings in one or more embodiments of the disclosure. Obviously, the described embodiments are only a part of the embodiments of the disclosure, but not all the embodiments. All other embodiments obtained by those skilled in the art based on one or more embodiments of the disclosure without creative efforts fall within the scope of protection of the disclosure.

The virtual object model in the disclosure may be a three-dimensional animal model, a three-dimensional human model or the like established by a computer. This is not limited in the disclosure. In the following, processing of deformation of a virtual object is described mainly with a human face model as an example. A user may customize a virtual object model by his/her own. For example, structural parameters (for example, bone parameters) of a preset virtual object model may be adjusted to change the appearance of the model.

Blend deformation data may be used in processing the deformation of the virtual object. The blend deformation data is stored in a blendshape, and indicates a degree of deformation of the virtual object (for example, a human face). The blend deformation data may be a difference between corresponding grid data when the model is blended from one shape to another shape. Since standard blend deformation data is made for a preset virtual object model, whether the standard blend deformation data can be adapted after the preset virtual object model is adjusted (for example, pinching the face) is a problem. Therefore, the standard blend deformation data needs to be updated. In the following description, with a virtual object being a human face as an example, the preset face may be a standard human face generated with default parameters generally used in the related art.

For convenience of description, in the following, bone parameters corresponding to the preset virtual object model are referred to as first bone parameters, and blend deformation data corresponding to the preset virtual object model is referred to as first blend deformation data, bone parameters corresponding to the target virtual object model are referred to as second bone parameters, and blend deformation data corresponding to the target virtual object model is referred to as second blend deformation data.

Figure 1:
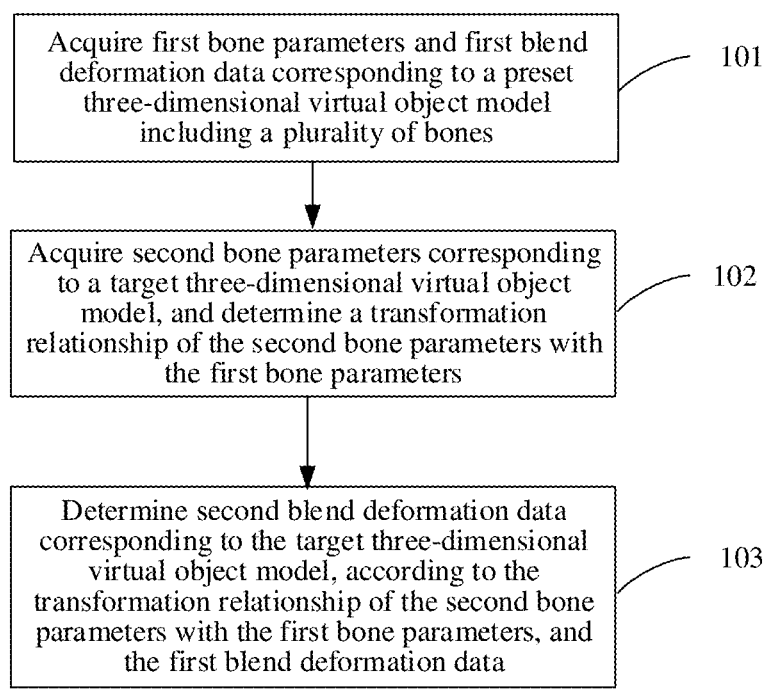
FIG. 1 illustrates an example of a method for processing deformation of a virtual object provided in at least one embodiment of the disclosure.

Based on the above problem, a method for processing deformation of a virtual object is provided in at least one embodiment of the disclosure. FIG. 1 illustrates a flow of the method according to an embodiment. The method may include the following operations.

In operation 101, first bone parameters and first blend deformation data corresponding to a preset three-dimensional virtual object model including multiple bones are acquired.

In this operation, the first blend deformation data indicates a degree of deformation of a preset virtual object (for example, a human face). That is, when the first blend deformation data is applied to a preset human face model, the preset face model may be deformed accordingly.

In a preset virtual object model generated based on bones, each bone may have multiple parameters. For example, the parameters may include at least one of: a displacement parameter t, a rotation parameter r, and a scaling parameter s. For a preset virtual object model, such as a preset human face model, bones included in the human face model are head bones, and bone parameters of each bone usually include values of an x axis, a y axis, and a z axis. Therefore, the bone parameters of the preset face model may be represented by $Bi=(tx, ty, tz, rx, ry, rz, sx, sy, sz)$, where $I=1, 2, \ldots, Nb$, and Nb is the number of bones contained in the model.

Figure 2A:
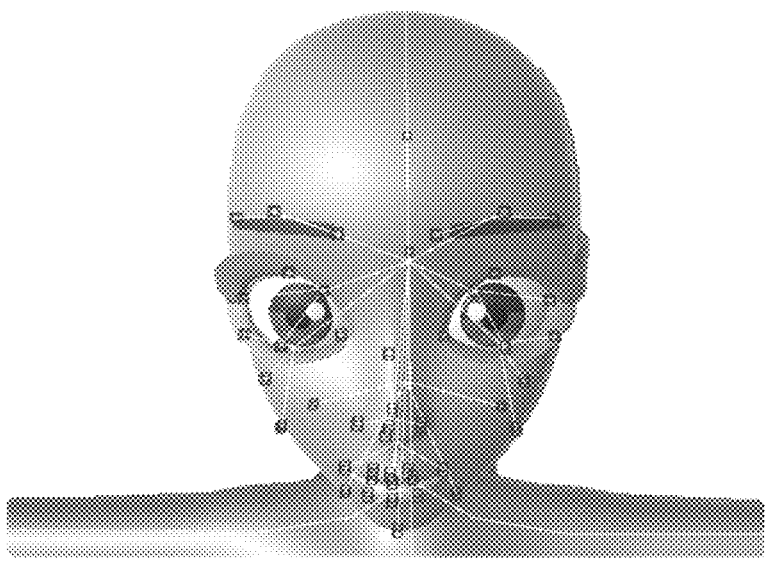
FIG. 2A illustrates a schematic diagram of a preset human face model established based on bones.

FIG. 2A illustrates a schematic diagram of a preset human face model established based on bones. The preset human face model is obtained by building a skeleton based on 48 bones and performing skinning processing based on the skeleton. The white lines in FIG. 2A represent the bones.

Those skilled in the art should understand that other types of data may also be obtained based on the preset virtual object model, which is not limited to the above.

In operation 102, second bone parameters corresponding to a target three-dimensional virtual object model are acquired, and a transformation relationship of the second bone parameters with the first bone parameters is determined.

In this operation, the target virtual object model may be obtained by adjusting the preset virtual object model, and the adjustment here may refer to adjusting the first bone parameters of the preset virtual object model, thereby obtaining the second bone parameters of the target virtual object model. The second bone parameters are the same as the first bone parameters in data format, and differ in values. Through the obtained second bone parameters and first bone parameters, a transformation relationship therebetween may be determined.

In operation 103, second blend deformation data corresponding to the target three-dimensional virtual object model is determined according to the transformation relationship of the second bone parameters with the first bone parameters, and the first blend deformation data.

Since the second bone parameters are obtained by making adjustment based on the first bone parameters, there is a transformation relationship therebetween. By applying the transformation relationship of the second bone parameters with the first bone parameters to the first blend deformation data, the second blend deformation data corresponding to the second bone parameters, that is, the second blend deformation data corresponding to the target three-dimensional virtual object model, may be obtained.

In the embodiment, the target three-dimensional virtual object model may be generated by adjusting the preset virtual object model. The second blend deformation data corresponding to the target virtual object model is acquired according to the first bone parameters and the first blend deformation data of the preset virtual object model obtained in advance, and the second bone parameters corresponding to the target virtual object model. In this way, data of the blendshape can be updated synchronously with the adjustment of the preset virtual object model, so that the blendshape is adapted to a new virtual object model (that is, the target virtual object model). Exemplarily, when blend deformation data is used to produce an expression, the accuracy of expression driving can be improved.

In the case where the blend deformation data is used to produce an expression, the first blend deformation data of the preset virtual object model may be a difference between grid data corresponding to the expression and standard grid data. The standard grid data here may include grid vertex data corresponding to the bones of the preset virtual object model.

After adjusting the preset virtual object model, the bone parameters have changed. Especially in the case of large changes, if the expression is still run with the standard blend deformation data, there will be a problem of non-adaptability. There will be large errors in the expression, affecting the realness and vividness of the model. Therefore, the blend deformation data needs to be updated to adapt to the adjusted target three-dimensional virtual object model, so that the expression can be run more accurately.

Figure 3:
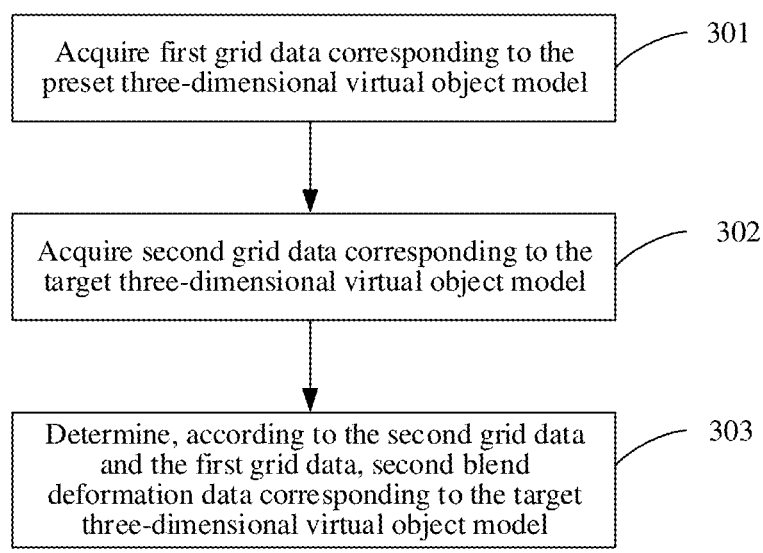
FIG. 3 illustrates an example of a method for obtaining second blend deformation data provided in at least one embodiment of the disclosure.

In an example, the method for obtaining the second blend deformation data, as illustrated in FIG. 3, may include the following operations.

In operation 301, first grid data corresponding to the preset three-dimensional virtual object model is acquired.

In an example, the operation that the first grid data corresponding to the preset three-dimensional virtual object model is acquired may include that: standard grid data corresponding to the first bone parameters is acquired; and the first grid data corresponding to the first blend deformation data is obtained according to the standard grid data and the first blend deformation data.

Figure 2B:
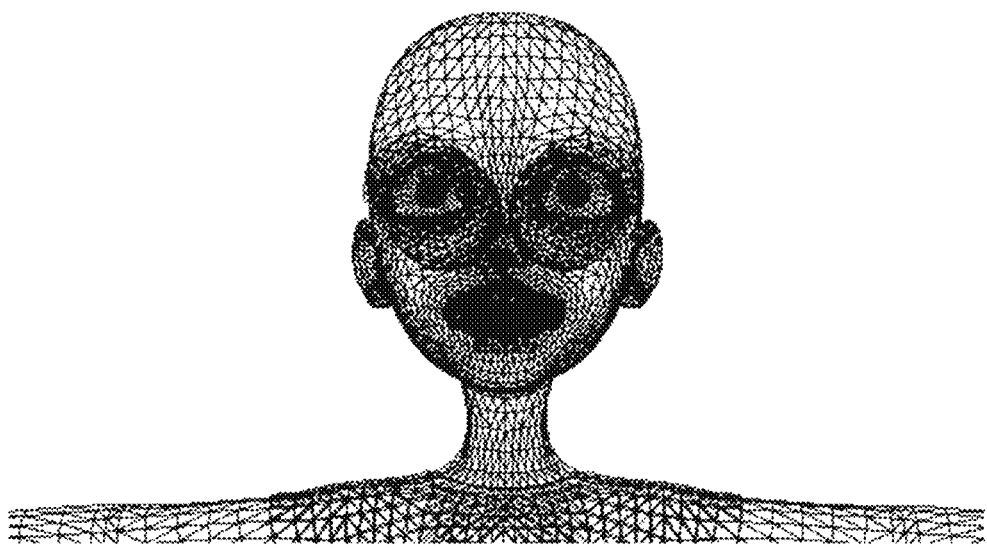
FIG. 2B illustrates an example of a grid corresponding to the preset human face model in FIG. 2A.

After acquiring the first bone parameters corresponding to the preset virtual object model, standard grid data corresponding to the first bone parameters can be obtained. FIG. 2B illustrates an example of standard grid data corresponding to bone parameters of a preset human face model (running no expression). The standard grid data may include grid vertex data corresponding to the bones when the preset face model is running no expression.

The differences between grid data corresponding to an expression and the standard grid data are stored in a blendshape. Therefore, after obtaining the standard grid data, the first grid data corresponding to the first blend deformation data can be restored by adding the standard grid data to the differences stored in a first blendshape (the blendshape corresponding to the first blend deformation data).

For example, it is supposed that the standard grid data corresponding to the preset human face model may be a vector [1, 1, 1, . . . , 1, 1]. The blend deformation data stored in a blendshape for controlling the size of eyes may be a vector [0, 0, 0.5, . . . , 0, 0] (both vectors have the same dimensions). When the blendshape is operated, by adding the stored first blend deformation data to the standard grid data, the effect of eye enlargement can be obtained on the preset human face. That is, the vector [1, 1, 1.5, . . . , 1, 1] obtained by adding the standard grid data to the first blend deformation data is the first grid data corresponding to the expression of eye enlargement. Those skilled in the art should understand that the above format of grid data is for illustration only, and the disclosure is not limited to the grid data format.

In operation 302, second grid data corresponding to the target three-dimensional virtual object model is acquired.

In an example, the operation that second grid data corresponding to the target three-dimensional virtual object model is acquired may include that: transformation matrixes of all or some bones in the target three-dimensional virtual object model are determined according to the second bone parameters and the first bone parameters; and the second grid data corresponding to the target three-dimensional virtual object model is determined by applying the transformation matrixes to the first grid data.

By traversing all or some bones in the aforementioned target virtual object model and preset virtual object model, a transformation matrix of each bone, that is, a transformation relationship of the second bone parameters with the first bone parameters, may be obtained.

Figure 4:
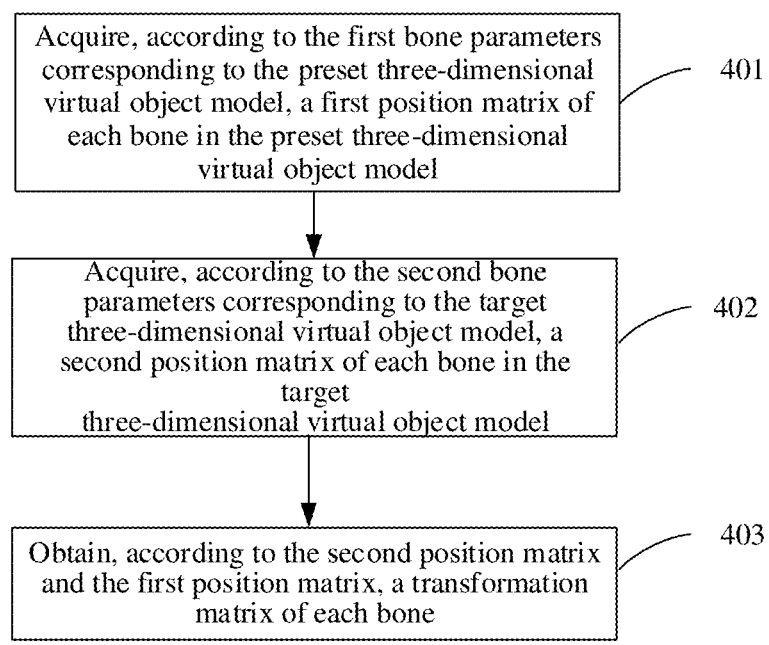
FIG. 4 illustrates an example of a method for obtaining a transformation matrix of a bone provided in at least one embodiment of the disclosure.

FIG. 4 illustrates a flow of a method for obtaining a transformation matrix of each bone according to an embodiment. As illustrated in FIG. 4, the method may include the following operations.

In operation 401, a first position matrix of each bone in the preset virtual object model is acquired according to the first bone parameters corresponding to the preset virtual object model.

In operation 402, a second position matrix of each bone in the target three-dimensional virtual object model is acquired according to the second bone parameters corresponding to the virtual object model.

In operation 403, a transformation matrix of each bone is obtained according to the second position matrix and the first position matrix.

In an example, a transformation matrix of each bone may be obtained by dividing the second position matrix by the first position matrix.

For example, the transformation matrix of a bone may be calculated by the following formula:

$$T = T_{new} * \text{inverse}(T_{normal}) \quad (1)$$

T represents the transformation matrix of the bone. $T_{new}$ represents the second position matrix of the bone corresponding to the target virtual object model. $T_{normal}$ represents the first position matrix of the bone corresponding to the preset virtual object model. The expression inverse( ) represents solving the inverse of the matrix.

By applying the transformation matrix of the bone to the first grid data, new grid vertex data may be obtained. New coordinates of grid vertexes, that is, the second grid data corresponding to the target virtual object model, are calculated according to a change state of a skeleton and binding information of each grid vertex, mainly based on the idea of skeleton skinning. For example, calculation may be made with the following formula:

$$\text{Vertex}_{new} = \sum_{i=0}^{k} T_i * \text{Vertex}_{ori} * \text{weight}_i \qquad (2)$$

$\text{Vertex}_{new}$ and $\text{Vertex}_{ori}$ represent a new grid vertex and an original grid vertex respectively, k indicates that the vertex is affected by k bones, and $T_i$ and $\text{weight}_i$ indicate a bone transformation matrix and a corresponding weight respectively.

In operation 303, second blend deformation data corresponding to the target three-dimensional virtual object model is determined according to the second grid data and the first grid data.

In an example, by subtracting the first grid data from the second grid data, the second blend deformation data corresponding to the target virtual object model may be obtained.

By still taking the blendshape for controlling the size of eyes as an example, the first grid data obtained in operation 301 corresponds to the grid data corresponding to the eye enlargement effect obtained on the preset human face model. The second grid data obtained in operation 302 corresponds to the grid data of the eye enlargement effect obtained on the target face model. The second blend deformation data obtained by subtracting the first grid data from the second grid data is the data stored in the blendshape corresponding to the target human face model.

In the embodiment, after the target virtual object model is generated, the transformation matrixes of the bones are applied to the blendshape corresponding to the preset virtual object model so that the blendshape is updated to adapt to the target virtual object model, thereby improving the accuracy of expression driving.

Those skilled in the art should understand that the method for processing deformation of a virtual object in the embodiment is not limited to the human face model generated by the above method for generating a target virtual object model, and may be used to update blend deformation data when arbitrary customization is performed based on the preset virtual object model. For the update of the blend deformation data of the customized model, in its transformation matrix, $T_{new}$ represents the position matrix of a bone corresponding to the customized model, and $T_{normal}$ represents the position matrix of the bone corresponding to the model before customization.

Figure 5:
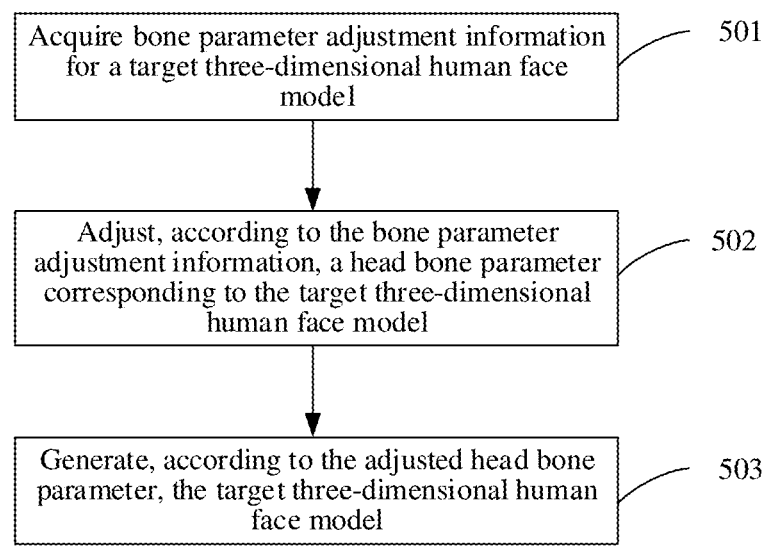
FIG. 5 illustrates an example of a method for generating a target human face model provided in at least one embodiment of the disclosure.

The target virtual object model to which the foregoing method for processing deformation of a virtual object is applied may be a human face model. Bones contained in the human face model are head bones. The human face model may be generated in the following manner FIG. 5 illustrates a flow of a method for generating a target human face model according to an embodiment. As illustrated in FIG. 5, the method may include the following operations.

In operation 501, bone parameter adjustment information of a target three-dimensional human face model is acquired.

In the embodiment, a bone parameter adjustment instruction may be received, and the bone parameter adjustment information may be determined according to the bone parameter adjustment instruction.

The acquired bone parameter adjustment information may be at least one of: a change quantity, or a relative change quantity or a change ratio.

In operation 502, head bone parameters corresponding to the target three-dimensional human face model are adjusted according to the bone parameter adjustment information.

In this operation, the head bone parameters are adjusted based on the change quantity or the relative change quantity or the change ratio contained in the bone parameter adjustment information, so that the head bone parameters change correspondingly. For example, the head bone parameters are increased/decreased by the corresponding change quantity or relative change quantity, or increased/decreased by the corresponding change ratio. After adjusting the head bone parameters, a set of adjusted bone parameters may be obtained.

In operation 503, the target three-dimensional human face model is generated according to the adjusted head bone parameters.

The head bone parameters are adjusted, that is, the bones of the target three-dimensional human face model are adjusted, thereby changing the bone structure of the model and obtaining the desired target three-dimensional human face model.

In the embodiment, by adjusting the head bone parameters according to the bone parameter adjustment information, at least one bone parameter in the head is adjusted simultaneously, so that the overall shape and local details of the model can be adjusted simultaneously. Adjustment can be made rapidly and finely. In the following description, the method for generating a target three-dimensional human face model will be described in more detail.

When applying the method of the embodiment to generate a target three-dimensional virtual object model, a control parameter for adjusting the bone parameters of the target three-dimensional virtual object model may be set in advance. The control parameters are a particular implementation of the above bone parameter adjustment information.

The control parameter is set based on the bone parameters of the target three-dimensional virtual object model. Therefore, the bone parameters (that is, the head bone parameters) of the target three-dimensional virtual object model may be obtained at first.

The bone parameters of the target three-dimensional virtual object model may be $B_i=(t_x, t_y, t_z, r_x, r_y, r_z, s_x, s_y, s_z)$, where i=1, 2, ..., Nb, and Nb is the number of bones contained in the target three-dimensional virtual object model. By adjusting the bone parameters Bi, one or more of the position, direction, and size of the bone may be changed, so that the bone structure of the target three-dimensional virtual object model can be changed. However, when the degree of freedom of the adjustable parameters is too high, it would be too difficult for the user to control local details. Therefore, in the embodiment, a control parameter is provided for the bone parameters of the target three-dimensional virtual object model, so as to adjust the bone structure.

The control parameter is associated with the parameters of at least one bone in the head. The association here means that when the control parameter is changed, one or more parameters of the at least one bone may change at the same time. Therefore, the control parameter may be regarded as a controller for the bone parameters associated with the control parameter. The at least one bone may belong to at least one local area in the head.

In an example, the setting of the above control parameter may be achieved by the following method. The method may include the following operations.

First, bones associated with the control parameter are acquired.

Bones associated with each control parameter may be preset. When adjusting the control parameter, the parameters of the bones associated with the control parameter would also be adjusted at the same time.

Figure 7A:
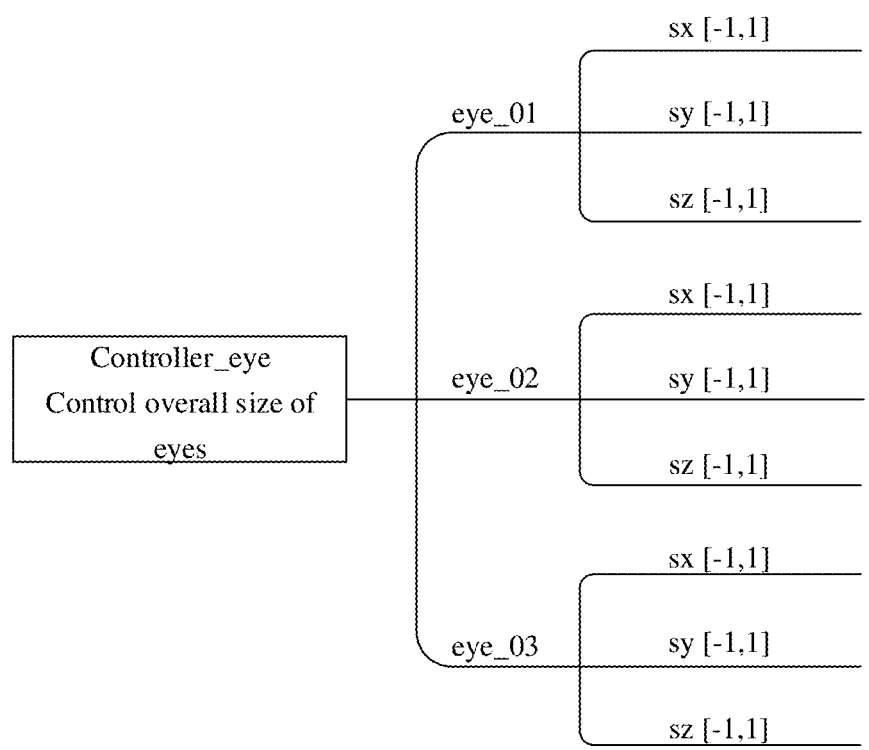
FIG. 7A illustrates an example of a method for setting two layers of parameters, for controlling an overall size of eyes provided in at least one embodiment of the disclosure.

For each control parameter, the parameters of multiple bones in a local area may be associated with the control parameter. The multiple bones may be all or a subset of the bones in the local area. For example, for an eye bone controller for adjusting the overall size of eyes, it is assumed that there are a total of E1 bones in the eye area, but the size of the eyes can be controlled by adjusting only E2 of the bones (E2<E1). Then the eye bone controller only needs to control the E2 bones. As illustrated in FIG. 7A, by associating the eye bone controller for adjusting the overall size of the eyes with the parameters of the bones eye_01, eye_02, and eye_03 (eye_01, eye_02, and eye_03 represent bones in the eye area), the eye bone controller is enabled to control the three bones. Next, among the bone parameters of each of the bones, bone parameters associated with the control parameters are obtained.

For each bone associated with the above control parameter, the control parameter may control all nine parameters of the bone, or may control one or more of the parameters. Parameters of each bone associated with the control parameter may be preset.

Figure 6:
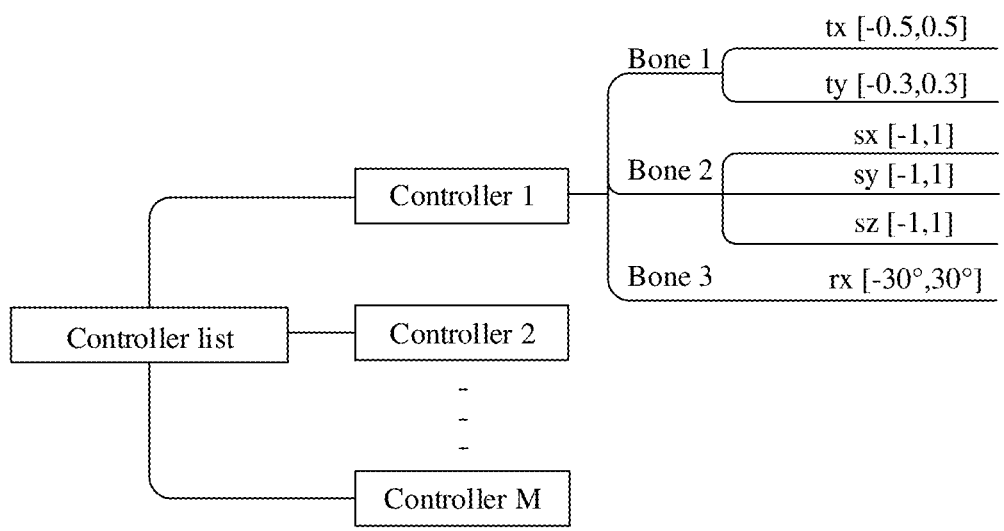
FIG. 6 illustrates an example of setting a control parameter provided in at least one embodiment of the disclosure.

An example illustrated in FIG. 6 include controller-1, controller-2, . . . , controller-M. M is the number of controllers. The controller1 may control three bones, i.e., bone1, bone2, and bone3. Parameters of each bone that can be controlled by the controller1 are as follows: a translation parameter (tx, ty) of bone1, a scaling parameter (sx, sy, sz) of bone 2, and a rotation parameter (rx) of bone 3. That is, by adjusting the control parameter in the controller1, the above parameters of the three bones may be adjusted at the same time.

Finally, each bone parameter associated with the control parameter is configured so that the bone parameter is adjusted simultaneously according to the change of the control parameter.

After one or more bone parameters associated with the control parameter are determined, each of the associated bone parameter is configured so that the bone parameter is adjusted simultaneously according to the change of the control parameter, thereby realizing control over the associated bone parameters by the control parameter. Exemplarily, one or more bone parameters associated with the control parameter may be adjusted at the same change ratio as the control parameter. For example, the adjustment amplitude of the value of the control parameter is an increment of $\frac{1}{10}$, and the adjustment amplitude of the value of one or more bone parameters associated therewith is also an increment of $\frac{1}{10}$.

In an example, the adjustment of the bone parameters by the control parameters may be achieved by the following method. The method includes the following operations.

First, a change range of the control parameter is acquired. The change range may be preset. Since the range is used to determine a relative change quantity of the control parameter, the setting of the specific range does not affect the implementation of the technical solution of the disclosure.

Next, a change range of each bone parameter associated with the control parameter is acquired. The change range may be preset, and the change range of the bone parameter may be specifically set according to the actual displacement, direction, distance, etc. of the bone to be adjusted. Exemplarily, if the change range of the bone parameter is 0, it indicates that the parameter cannot be adjusted. Namely, it is not controlled by the control parameter.

Then, each bone parameter associated with the control parameter is configured so that: according to the change ratio of the control parameter within the change range, the bone parameter changes by the same change ratio within the change range of the bone parameter simultaneously. The change ratio referred to here may also be expressed as a relative change quantity. For example, for the controller1 in FIG. 6, if the change range of the control parameter is [0, 1], when the value of the control parameter changes from 0.2 to 0.3, the relative change quantity is $\frac{1}{10}$. That is, the change ratio is $\frac{1}{10}$. Then, the bone parameter values of bone1, bone2, and bone3 associated with the controller1 are also adjusted to increase by $\frac{1}{10}$. Thus, the control parameter and the bone parameters associated with the control parameter are adjusted simultaneously. Exemplarily, the above event that the bone parameters change in equal proportion as the control parameter may be implemented by a linear interpolation algorithm.

Those skilled in the art should understand that different modes of change may be provided for different bone parameters. For example, when the value of the control parameter of the controller1 changes from 0.2 to 0.3, the bone parameter of bone1 may be adjusted to increase by $\frac{1}{10}$, while the bone parameters of bone2 and bone3 may be adjusted to increase by $\frac{1}{5}$. In other words, different bone parameters may have different trends of change. It should be understood that when the value of the control parameter changes from 0 to 1, each bone parameter also changes from a minimum value to a maximum value in the respective change interval, but the change process of each bone parameter may be different. Exemplarily, the above event that different bone parameters change with the control parameters in different trends may be implemented by a nonlinear interpolation algorithm.

In at least one embodiment of the disclosure, the operation that the bone parameter adjustment information is acquired includes that: a bone parameter adjustment instruction is received; and the bone parameter adjustment information is determined according to the bone parameter adjustment instruction.

The bone parameter adjustment instruction may refer to an instruction for adjusting the control parameter. The bone parameter adjustment information may be determined according to the instruction for adjusting the control parameter.

After acquiring the bone parameter adjustment information, bone parameters of at least one head bone associated with the bone parameter adjustment information are acquired. That is, bone parameters of the at least one head bone associated with the control parameter are acquired. The bone parameters of the at least one head bone are adjusted according to the bone parameter adjustment information.

When the at least one head bone includes one bone, bone parameters of the bone are adjusted according to the bone parameter adjustment information. When the at least one head bone includes multiple bones, bone parameters of the multiple head bones are adjusted simultaneously according to the bone parameter adjustment information.

In an example, the operation that the bone parameters of the at least one head bone are adjusted according to the bone parameter adjustment information may include that: an adjustment range of the bone parameter adjustment information is acquired; an adjustment range of each bone parameter associated with the bone parameter adjustment information is acquired; and bone parameters of the at least one head bone associated with the bone parameter adjustment information are adjusted according to a change ratio of the bone parameter adjustment information within the corresponding adjustment range. The adjustment of the bone parameters is performed within the adjustment range of the respective bone parameters.

In an example, a control may be provided in advance for the bone parameter adjustment instruction, such as a slider, and an instruction for adjusting the control parameter may be generated by operating the control. When generating the model, by acquiring a change quantity output by the control, that is, acquiring the bone parameter adjustment information corresponding to the adjustment instruction, the associated bone parameters can be adjusted.

The adjustment of the overall size of eyes as illustrated in FIG. 7A is taken as an example to specifically describe the control over a face model by a control parameter.

Figure 7B:
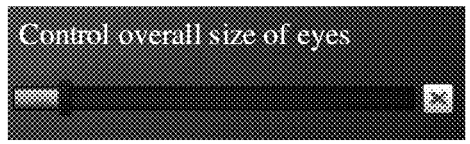
FIG. 7B illustrates an example of a control for controlling an overall size of eyes provided in at least one embodiment of the disclosure.

For example, the parameter change range of the controller (controller1_eye) for controlling the overall size of eyes is set to [0, 1], that is, the value of the control parameter thereof may be any value between [0, 1]. The value of the control parameter may change in this interval by operating the slider, as illustrated in FIG. 7B.

The controller (controller1_eye) may control three bones in the eye area, i.e., eye_01, eye_02, and eye_03. The parameter of each bone that can be controlled by the controller (controller1_eye) is as follows: a scaling parameter (sx, sy, sz) of the bone eye_01, a scaling parameter (sx, sy, sz) of the bone eye_02, and a scaling parameter (sx, sy, sz) of the bone eye_03. Exemplarily, the adjustment range of each parameter is [−1, 1], that is, each parameter value may be any numeric value within the interval. Exemplarily, the adjustment range of other parameters of the three bones is 0, namely, the other parameters cannot be adjusted by the controller (controller1_eye) and are not displayed in a control list.

The slider corresponding to the controller (controller1_eye) is operated to change the value of the control parameter, and the numeric value is obtained. Then, linear interpolation is performed, using the numeric value, on the respective parameters of the three bones corresponding to the controller (controller1_eye) within respective adjustment ranges, to obtain the adjusted value of each parameter. That is, based on the change in the value of the control parameter of the controller (controller1_eye) within its parameter range, the value of the associated bone parameters changes in an equal proportion within the adjustment range of the bone parameters. As a result, the overall size of the eyes is adjusted.

Figure 7C:
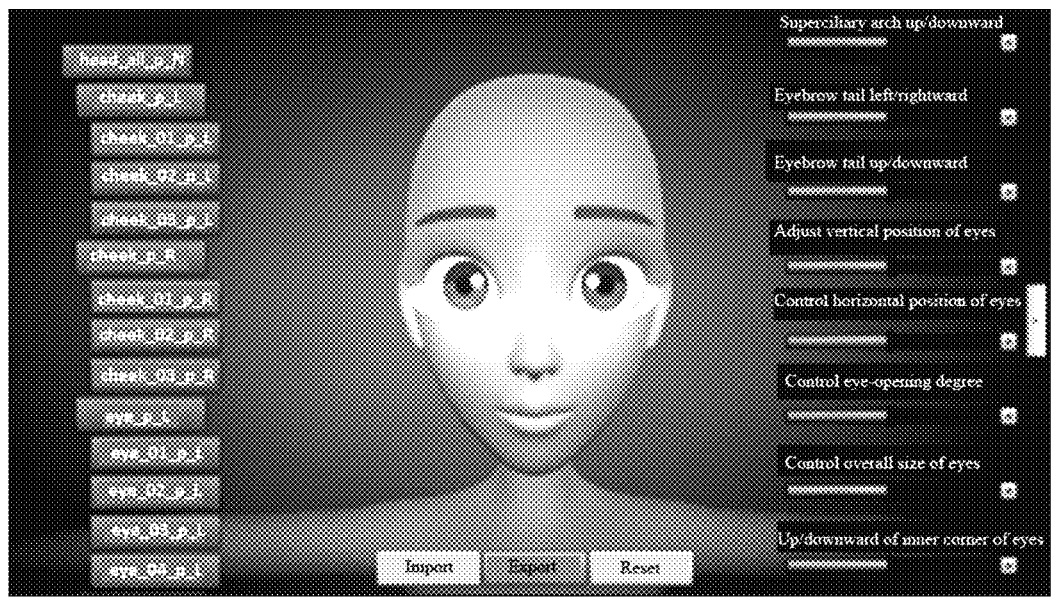
FIGS. 7C and 7D illustrate an example of a human face model before adjustment and an example of a target human face model provided in at least one embodiment of the disclosure.
Figure 7D:
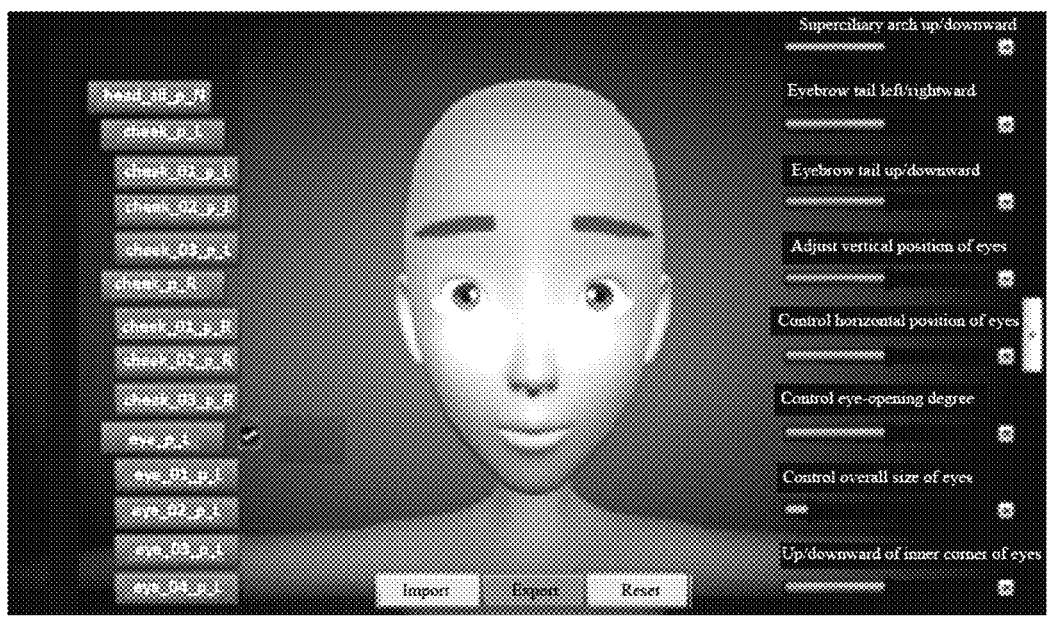

FIG. 7C illustrates a schematic diagram of an overall size of original eyes. Each block on the left represents a bone parameter, including: a head overall parameter (head_all_p_N), a left cheek overall parameter (cheek_p_L), left cheek parameters (cheek_01_p_L, cheek_02_p_L, cheek_03_p_L), a right cheek overall parameter (cheek_p_R), right cheek parameters (cheek_01_p_R, cheek02_p_R, cheek_03_p_R), an eye overall parameter (eye_p_L), and eye parameters (eye_01_p_L, eye_02_p_L, eye_03_p_L, eye_04_p_L). The right are slider controls for respective controllers. For example, by operating the slider illustrated in FIG. 7B to decrease the value of the control parameter, the effect of reducing the overall size of both eyes illustrated in FIG. 7D is obtained. Those skilled in the art should know that FIGS. 7C to 7D show a three-dimensional model obtained by skinning on the basis of a skeleton, but the effect produced by bone changes can be reflected.

In an example, when the adjusted bone has a bone symmetrical thereto, the parameters of the bone symmetrical to the adjusted bone change correspondingly. As illustrated in FIG. 2A, most of the bones of a human face are symmetrical. For symmetrical bones, when a bone on one side is adjusted, the bone on the other side will also change accordingly. In other words, the parameters of one of the symmetrical bones are associated with the parameters of the other. When a parameter of one of the bones has changed, and the parameter of the other bone will also change accordingly.

By changing the symmetrical bones accordingly as one another, the symmetry of the human face can be maintained when the adjustment operations are reduced.

The local area mentioned in the disclosure may be a single area or multiple areas that need to be controlled by the control parameter in order to achieve a certain effect. The control corresponding to the control parameter may be named based on the effect that can be achieved by the control parameter. As illustrated in FIGS. 7C to 7D, controls named such as "eyebrow tail left/rightward" and "eyebrow tail up/downward" are included, which intuitively reflect the effects that can be achieved by the controls, and are convenient for users to operate.

For the generated human face model, a custom makeup is usually generated by model segmentation, and a separate model is separated for each replaceable component based on a character model. However, in this way, a graphical programming interface will be called by multiple central processing units (CPUs) (draw call) in a rendering stage, thus seriously affecting the performance of the program.

Figure 8:
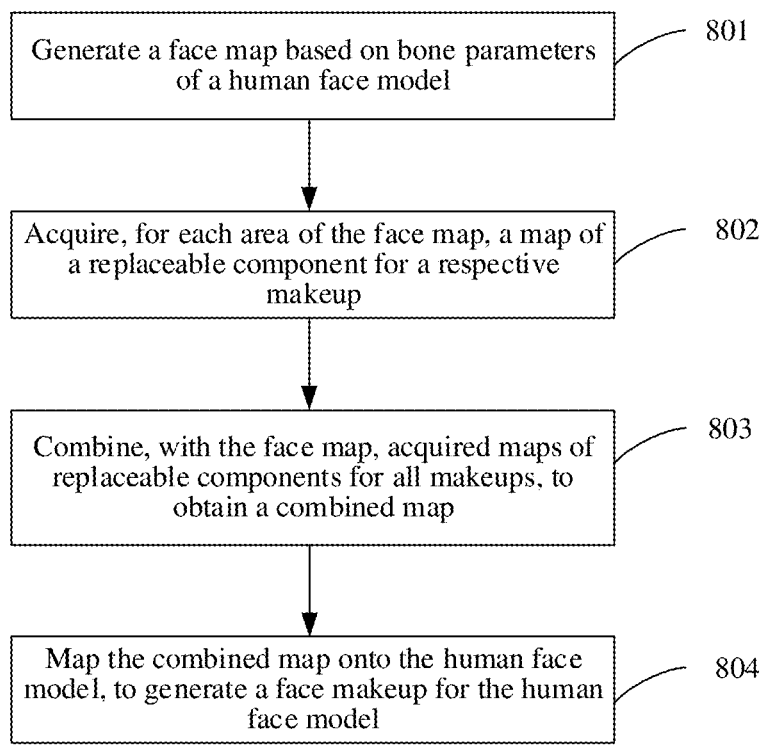
FIG. 8 illustrates an example of a method for generating a face makeup provided in at least one embodiment of the disclosure.

Based on this, in the following embodiments, a method for generating a face makeup for a generated human face model is proposed. As illustrated in FIG. 8, the following operation may be included.

In operation 801, a face map is generated based on bone parameters of the human face model.

In the operation, a face map may be generated according to the bone parameters of the human face model. The face map may include multiple areas corresponding to makeups, and the size and position of each rectangular area is usually different for different bone parameters. The makeups mentioned here refers to face components replaceable for the human face model, such as eyebrows, cheek colors, lips, and beards, rather than irreplaceable face parts already existing in the generated model. Those skilled in the art should understand that the replaceable face components are not limited to the above, but may also include other face makeups.

Those skilled in the art should understand that the face map may also be made and generated in other ways, and is not limited to being generated based on the bone parameters of the human face model above.

Figure 9A:
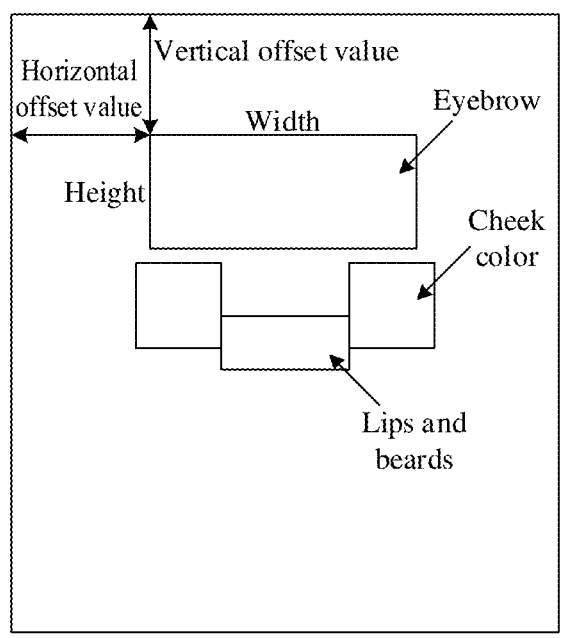
FIG. 9A illustrates an example of a face map provided in at least one embodiment of the disclosure.

As illustrated in FIG. 9A, the face map includes rectangular areas corresponding to the eyebrows, the cheek color, the lips, or the lips and beards together. Each rectangular area may include at least one of: a width, a height, a horizontal coordinate offset value, and a vertical coordinate offset value.

In operation 802, a map of a replaceable component for a corresponding makeup is acquired for each of the areas.

Figure 9B:
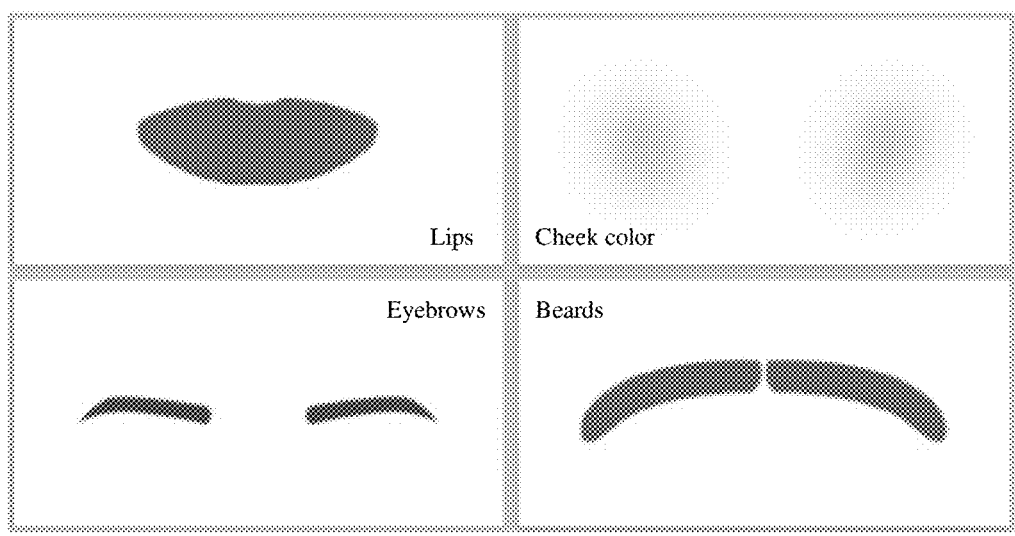
FIG. 9B illustrates an example of a map of a replaceable component provided in at least one embodiment of the disclosure.

The rectangular area is taken as an example. In this operation, a map may be made and generated for the replaceable component corresponding to the makeup according to the parameters of the rectangular area, or a corresponding map may be called and imported. An example of the map is illustrated in FIG. 9B. The map of each corresponding replaceable component is consistent with the corresponding rectangular area in both width and height.

The color of the map of each replaceable component is changeable, and a layer of detail texture may be adhered to the map.

In an example, the texture may be generated for the map of the replaceable component by mixing transparency information and texture information of the map of the replaceable component. The texture information is selected for the map of the replaceable component, and a mixing formula is as follows:

$$Color_{final} = \begin{cases} Color_{base}, & Alpha\, !=1 \\ Color_{detail}, & Alpha == 1 \end{cases} \quad (3)$$

$Color_{final}$ represents a final color manifested by the map, $Color_{base}$ represents the color of a face map when Alpha!=1, and $Color_{detail}$ represents the color of the map of the replaceable component when Alpha==1.

In operation 803, maps of replaceable components acquired for all makeups are combined with the face map to obtain a combined map.

In an example, the map of the replaceable component for each makeup may be combined with the face map in the following manner. The map of the replaceable component is copied to a corresponding rectangular area of the face map according to a horizontal coordinate offset value and a vertical coordinate offset value of a rectangular area corresponding to the map of the replaceable component, and the face map and the map of the replaceable component are mixed according to transparency information. The transparency information is transparency information of the map of the replaceable component.

In an example, the face map may be first copied to a RenderTexture, then the map of each replaceable component is copied to the corresponding rectangular area of the face map. Combination of the map of the replacement component and the face map is realized by the RenderTexture.

In an example, the face map and a shader corresponding thereto may be copied into the RenderTexture together.

Figure 9C:
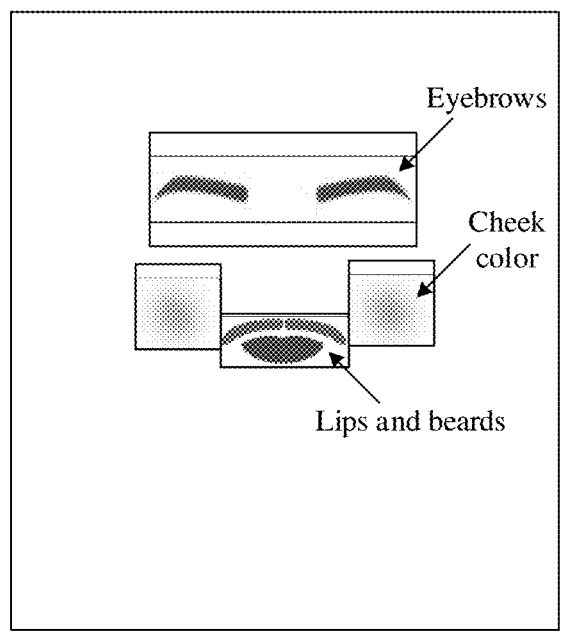
FIG. 9C illustrates an example of generating map textures provided in at least one embodiment of the disclosure.

The result of combining the map of the replaceable component and the face map is illustrated in FIG. 9C.

In operation 804, the combined map is mapped onto the human face model to generate a face makeup of the human face model.

In an example, the face map may be first rendered onto a FrameBufferObject, and the FrameBufferObject is associated to a map object corresponding to the face model on a graphical processing unit (GPU) according to texture coordinates UV of the human face model, so as to realize the mapping of the combined map onto the face model.

Figure 10A:
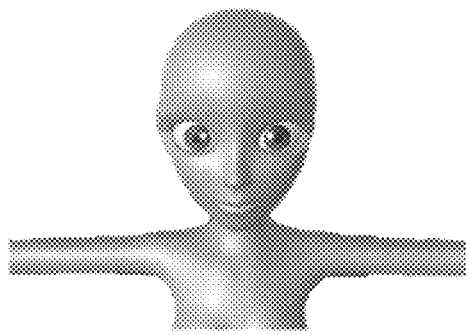
FIGS. 10A and 10B illustrate a human face model with no makeup generated, and the human face model with a makeup generated, provided in at least one embodiment of the disclosure.
Figure 10B:
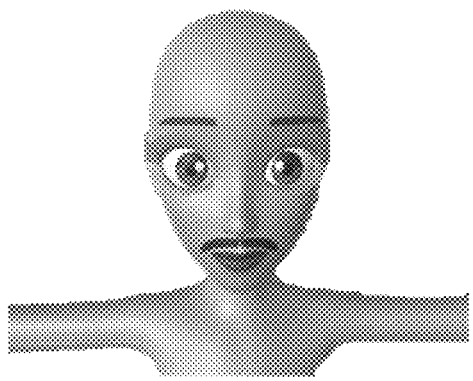

FIG. 10A illustrates an initial human face model, and FIG. 10B illustrates a human face model with a face makeup generated by the above method.

In the embodiment, a face map, and a replaceable map of a makeup corresponding to each rectangular area of the face map are generated. The face map and the replaceable map are combined before being drawn, improving the efficiency of rendering.

Figure 11A:
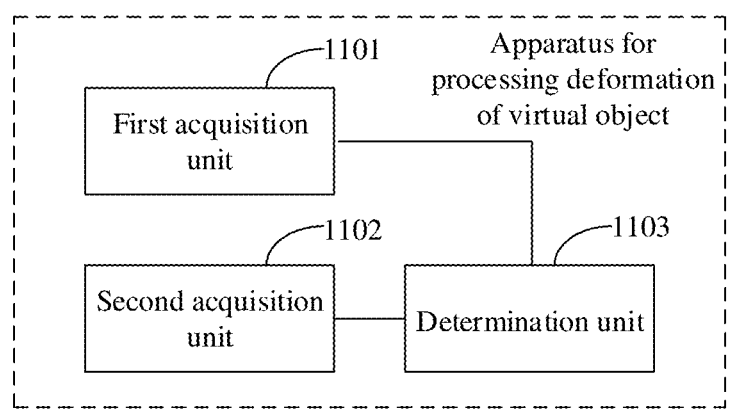
FIG. 11A illustrates an example of an apparatus for processing deformation of a virtual object provided in at least one embodiment of the disclosure.

In FIG. 11A, an apparatus for processing deformation of a virtual object is provided. As illustrated in FIG. 11A, the apparatus may include a first acquisition unit 1101, a second acquisition unit 1102 and a determination unit 1103.

The first acquisition unit 1101 is configured to acquire first bone parameters and first blend deformation data corresponding to a preset three-dimensional virtual object model including a plurality of bones, the first blend deformation data indicating a degree of deformation of a preset three-dimensional virtual object.

The second acquisition unit 1102 is configured to acquire second bone parameters corresponding to a target three-dimensional virtual object model, and determine a transformation relationship of the second bone parameters with the first bone parameters.

The determination unit 1103 is configured to determine second blend deformation data corresponding to the three-dimensional target virtual object face model, according to the transformation relationship of the second bone parameters with the first bone parameters, and the first blend deformation data.

Figure 11B:
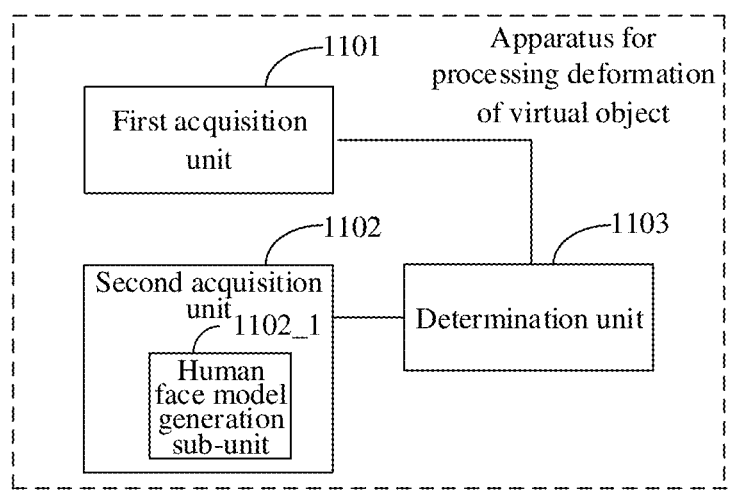
FIG. 11B illustrates an example of another apparatus for processing deformation of a virtual object provided in at least one embodiment of the disclosure.

In FIG. 11B, another apparatus for processing deformation of a virtual object is provided. As illustrated in FIG. 11B, the second acquisition unit 1102 includes a human face model generation sub-unit 1102_1. The human face model generation sub-unit 1102_1 is configured to generate a target human face model, and is specifically configured to: acquire bone parameter adjustment information for a target three-dimensional human face model; adjust, according to the bone parameter adjustment information, a head bone parameter corresponding to the target three-dimensional human face model; and generate, according to the adjusted head bone parameter, the target three-dimensional human face model.

Figure 12:
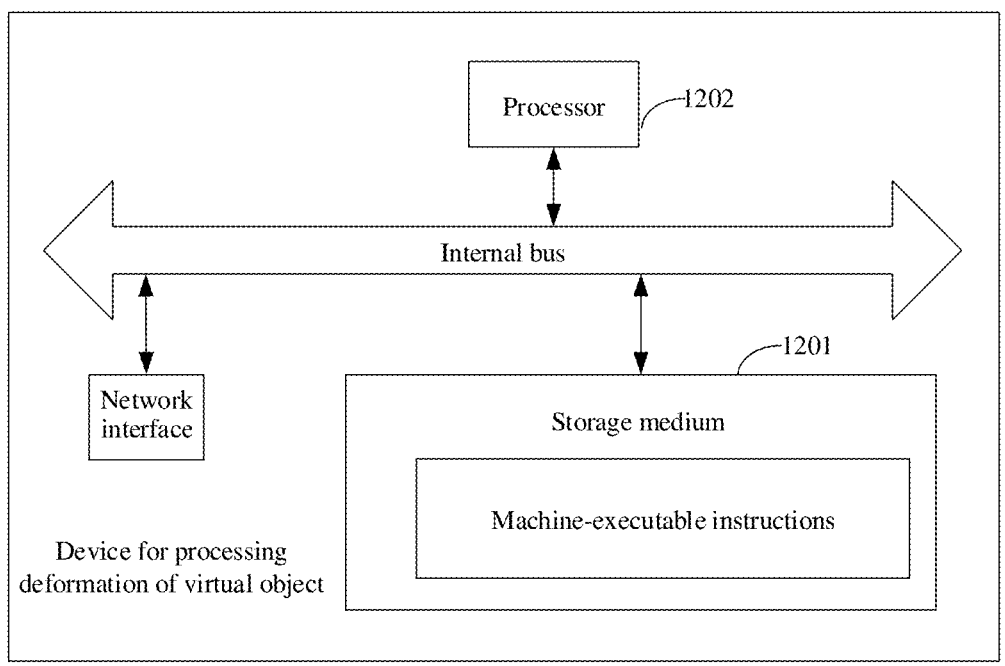
FIG. 12 illustrates an example of a device for processing deformation of a virtual object provided in at least one embodiment of the disclosure.

FIG. 12 illustrates a device for processing deformation of a virtual object provided in at least one embodiment of the disclosure. As illustrated in FIG. 12, the device may include a storage medium 1201 and a processor 1202. The storage medium 1201 is configured to store machine-executable instructions executable on the processor. The processor 1202 is configured to execute the machine-executable instructions to implement the method for processing deformation of a virtual object according to any embodiment of the disclosure.

In at least one embodiment of the disclosure, further provided is a machine-readable storage medium with machine-executable instructions stored thereon. The machine-executable instructions, when executed by a processor, cause the processor to implement the method for processing deformation of a virtual object according to any embodiment of the disclosure.

According to the method, apparatus and device for processing deformation of a virtual object, and the storage medium according to one or more embodiments of the disclosure, a virtual object model is adjusted to generate a target three-dimensional virtual object model, second blend deformation data corresponding to the target virtual object model is acquired according to bone parameters and first blend deformation data of the preset virtual object model obtained in advance, and bone parameters corresponding to the target virtual object model. Data of a blendshape may be synchronously updated according to adjustment of the preset virtual object model, so that the blendshape is adapted to the new virtual object model (namely, the target virtual object model). Exemplarily, the accuracy of expression driving can be improved when the blend deformation data is used to produce an expression.

Those skilled in the art should understand that one or more embodiments of the disclosure may be provided as a method, a system, or a computer program product. Therefore, one or more embodiments of the disclosure may take the form of an entirely hardware embodiment, an entirely software embodiment, or an embodiment combining software and hardware. Moreover, one or more embodiments of the disclosure may take the form of a computer program product implemented on one or more computer-available storage media (including but not limited to a disk memory, a compact disc read-only memory (CD-ROM), an optical memory, etc.) containing computer-available program codes.

The embodiments in the specification are described in a progressive manner. The same or similar parts between the embodiments can be referred to each other, and each embodiment focuses on the differences from other embodiments. In particular, for the embodiment of the device for data processing, since it is basically similar to the method embodiment, the description is relatively simple, and the relevant part can be referred to the description of the method embodiment.

The foregoing describes specific embodiments of the disclosure. Other embodiments are within the scope of the following claims. In some cases, the actions or operations recited in the claims may be performed in a different order than in the embodiments and still achieve the desired results. In addition, the processes depicted in the drawings do not necessarily require the particular order shown or sequential order to achieve the desired results. In some embodiments, multitasking and parallel processing are also possible or may be advantageous.

Embodiments of the subject matter and functional operations described in the disclosure may be implemented in: digital electronic circuits, tangibly embodied computer software or firmware, computer hardware including the structures disclosed in the disclosure and their structural equivalents, or one or more combinations thereof. Embodiments of the subject matter described in the specification may be implemented as one or more computer programs, that is, one or more modules of computer program instructions encoded on a tangible non-transitory program carrier to be executed by a device for data processing or to control the operation of the device for data processing. Alternatively or additionally, the program instructions may be encoded on an artificially generated propagation signal, such as a machine-generated electrical, optical, or electromagnetic signal, which is generated to encode and transmit the information to a suitable receiver apparatus to be executed by the data processing apparatus. The computer storage medium may be a machine-readable storage device, a machine-readable storage substrate, a random or serial access memory device, or a combination of one or more of them.

The processes and logic flows described in the disclosure may be performed by one or more programmable computers that execute one or more computer programs, so as to perform corresponding functions by operating according to input data and generating output. The processing and logic flow may also be performed by dedicated logic circuits such as a Field Programmable Gate Array (FPGA) or an Application Specific Integrated Circuit (ASIC), and the apparatus may also be implemented as a dedicated logic circuit.

Computers suitable for executing computer programs include, for example, general-purpose and/or special-purpose microprocessors, or any other type of central processing unit. Generally, the central processing unit will receive instructions and data from a read-only memory and/or a random access memory. The basic components of a computer include a central processing unit for implementing or executing instructions and one or more memory devices for storing instructions and data. Generally, the computer will also include one or more mass storage devices for storing data, such as magnetic disks, magneto-optical disks, or optical disks, or the computer will be operably coupled to the mass storage device to receive data from or transmit data to it, or both. However, the computer does not necessarily include such a device. In addition, the computer may be embedded in another device, such as a mobile phone, a Personal Digital Assistant (PDA), a mobile audio or video player, a game console, a Global Positioning System (GPS) receiver, or a portable storage device such as a Universal Serial Bus (USB) flash drive, to name a few.

Computer-readable media suitable for storing computer program instructions and data include all forms of non-volatile memory, media, and storages, including, for example, semiconductor memories (such as Electrically Programmable Read-Only Memories (EPROMs), an Electrically Erasable Programmable Read-Only Memories (EEPROMs), and flash memories), magnetic disks (such as internal hard drives, or mobile disks), magneto-optical disks, CD ROMs and DVD-ROMs. The processor and the memory may be supplemented by, or incorporated in, dedicated logic circuits.

Although this specification contains many specific implementation details, these should not be construed as limiting the scope of the disclosure or the claimed scope, but are mainly used to describe features of specific embodiments. Certain features described in multiple embodiments within the disclosure may also be implemented in combination in a single embodiment. On the other hand, various features described in a single embodiment may also be implemented separately in multiple embodiments or in any suitable sub-combination. In addition, although features may function in certain combinations as described above and even initially claimed as such, one or more features from the claimed combination may, in some cases, be removed from the combination and the claimed combinations may point to sub-combinations or variations of sub-combinations.

Similarly, although the operations are depicted in a specific order in the drawings, this should not be construed as requiring these operations to be performed in the specific order shown or sequentially, or requiring all illustrated operations to be performed to achieve the desired result. In some cases, multitasking and parallel processing may be advantageous. In addition, the separation of various system modules and components in the above embodiments should not be understood as requiring such separation in all embodiments, and it should be understood that the described program components and systems may generally be integrated together in a single software product, or packaged into multiple software products.

Thus, specific embodiments of the subject matter have been described. Other embodiments are within the scope of the appended claims. In some cases, the actions recited in the claims may be performed in a different order and still achieve the desired results. In addition, the processes depicted in the drawings are not necessarily in the specific order shown or sequential order to achieve the desired results. In some implementations, multitasking and parallel processing may be advantageous.

The invention claimed is:

1. A method for processing deformation of a virtual object, comprising:
   acquiring first bone parameters and first blend deformation data corresponding to a preset three-dimensional virtual object model comprising a plurality of bones, the first blend deformation data indicating a degree of deformation of the preset three-dimensional virtual object;
   acquiring second bone parameters corresponding to a target three-dimensional virtual object model, and determining a transformation relationship of the second bone parameters with the first bone parameters; and determining second blend deformation data corresponding to the target three-dimensional virtual object model, according to the transformation relationship of the second bone parameters with the first bone parameters, and the first blend deformation data.

2. The method according to claim 1, wherein determining the second blend deformation data corresponding to the target three-dimensional virtual object model, according to the transformation relationship of the second bone parameters with the first bone parameters, and the first blend deformation data comprises:

acquiring first grid data corresponding to the preset three-dimensional virtual object model;

acquiring second grid data corresponding to the target three-dimensional virtual object model; and determining, according to the second grid data and the first grid data, the second blend deformation data corresponding to the target three-dimensional virtual object model.

3. The method according to claim 2, wherein acquiring the first grid data corresponding to the preset three-dimensional virtual object model comprises:

acquiring standard grid data corresponding to the first bone parameters; and obtaining, according to the standard grid data and the first blend deformation data, the first grid data corresponding to the first blend deformation data.

4. The method according to claim 2, wherein acquiring the second grid data corresponding to the target three-dimensional virtual object model comprises:

determining, according to the second bone parameters and the first bone parameters, transformation matrices, each corresponding to a respective bone in the target three-dimensional virtual object model; and determining, by applying the transformation matrices to the first grid data, the second grid data corresponding to the target three-dimensional virtual object model.

5. The method according to claim 4, wherein determining, according to the second bone parameters and the first bone parameters, the transformation matrices, each corresponding to a respective bone in the target three-dimensional virtual object model comprises:

acquiring, according to the first bone parameters corresponding to the preset three-dimensional virtual object model, a first position matrix of each bone in the preset three-dimensional virtual object model;

acquiring, according to the second bone parameters corresponding to the target three-dimensional virtual object model, a second position matrix of each bone in the target three-dimensional virtual object model; and obtaining, according to the second position matrix and the first position matrix, a transformation matrix of each bone.

6. The method according to claim 1, wherein the target three-dimensional virtual object model is a target human face model, the bones in the target three-dimensional virtual object model are head bones, and the target three-dimensional virtual object model is generated by:

acquiring bone parameter adjustment information for a target three-dimensional human face model;

adjusting, according to the bone parameter adjustment information, a head bone parameter corresponding to the target three-dimensional human face model; and generating, according to the adjusted head bone parameter, the target three-dimensional human face model.

7. The method according to claim 6, wherein acquiring the bone parameter adjustment information for the target three-dimensional human face model comprises:

receiving a bone parameter adjustment instruction; and determining, according to the bone parameter adjustment instruction, the bone parameter adjustment information.

8. The method according to claim 6, wherein adjusting, according to the bone parameter adjustment information, the head bone parameter corresponding to the target three-dimensional human face model comprises:

acquiring, from the head bone parameters, a bone parameter of at least one head bone associated with the bone parameter adjustment information; and adjusting, according to the bone parameter adjustment information, the bone parameter of the at least one head bone.

9. The method according to claim 8, wherein the at least one head bone includes a plurality of head bones, and adjusting, according to the bone parameter adjustment information, the bone parameter of the at least one head bone comprises:

adjusting, according to the bone parameter adjustment information, bone parameters of the plurality of head bones simultaneously.

10. The method according to claim 8, wherein adjusting, according to the bone parameter adjustment information, the bone parameter of the at least one head bone comprises:

acquiring an adjustment range of the bone parameter adjustment information;

acquiring an adjustment range of each bone parameter associated with the bone parameter adjustment information; and adjusting, according to a change ratio of the bone parameter adjustment information within the adjustment range of the bone parameter adjustment information, the bone parameter of the at least one head bone associated with the bone parameter adjustment information.

11. The method according to claim 7, wherein determining, according to the bone parameter adjustment instruction, the bone parameter adjustment information comprises:

acquiring a change quantity output by a control, wherein the control is configured for the bone parameter adjustment instruction; and determining, according to the outputted change quantity, the bone parameter adjustment information.

12. The method according to claim 6, further comprising:

generating a face map based on the head bone parameters of the target three-dimensional human face model, wherein the face map comprises a plurality of areas, each corresponding to a respective makeup;

acquiring, for each of the plurality of areas, a map of a replaceable component for a respective makeup;

combining, with the face map, acquired maps of replaceable components for all makeups, to obtain a combined map; and mapping the combined map onto the target three-dimensional human face model, to generate a face makeup for the target three-dimensional human face model.

13. An apparatus for processing deformation of a virtual object, comprising:

a processor; and a memory configured to store instructions which, when being executed by the processor, cause the processor to carry out the following:

acquiring first bone parameters and first blend deformation data corresponding to a preset three-dimensional virtual object model comprising a plurality of bones, the first blend deformation data indicating a degree of deformation of the preset three-dimensional virtual object;

acquiring second bone parameters corresponding to a target three-dimensional virtual object model, and determining a transformation relationship of the second bone parameters with the first bone parameters; and determining second blend deformation data corresponding to the target three-dimensional virtual object model, according to the transformation relationship of the second bone parameters with the first bone parameters, and the first blend deformation data.

14. The apparatus according to claim 13, wherein the instructions, when being executed by the processor, cause the processor to carry out the following:

acquiring first grid data corresponding to the preset three-dimensional virtual object model;

acquiring second grid data corresponding to the target three-dimensional virtual object model; and determining, according to the second grid data and the first grid data, the second blend deformation data corresponding to the target three-dimensional virtual object model.

15. The apparatus according to claim 14, wherein in acquiring the second grid data corresponding to the target three-dimensional virtual object model, the instructions, when being executed by the processor, cause the processor to carry out the following:

determining, according to the second bone parameters and the first bone parameters, transformation matrixes, each corresponding to a respective bone in the target three-dimensional virtual object model; and determining, by applying the transformation matrixes to the first grid data, the second grid data corresponding to the target three-dimensional virtual object model.

16. The apparatus according to claim 15, wherein in determining, according to the second bone parameters and the first bone parameters, the transformation matrixes, each corresponding to a respective bone in the target three-dimensional virtual object model, the instructions, when being executed by the processor, cause the processor to carry out the following:

acquiring, according to the first bone parameters corresponding to the preset three-dimensional virtual object model, a first position matrix of each bone in the preset three-dimensional virtual object model;

acquiring, according to the second bone parameters corresponding to the target three-dimensional virtual object model, a second position matrix of each bone in the target three-dimensional virtual object model; and obtaining, according to the second position matrix and the first position matrix, a transformation matrix of each bone.

17. The apparatus according to claim 13, wherein the target three-dimensional virtual object model is a human face model, the bones in the target three-dimensional virtual object model are head bones, and the instructions, when being executed by the processor, cause the processor to carry out the following:

acquiring bone parameter adjustment information for a target three-dimensional human face model;

adjusting, according to the bone parameter adjustment information, a head bone parameter corresponding to the target three-dimensional human face model; and generating, according to the adjusted head bone parameter, the target three-dimensional human face model.

18. The apparatus according to claim 17, wherein in adjusting, according to the bone parameter adjustment information, the head bone parameter corresponding to the target three-dimensional human face model, the instructions, when being executed by the processor, cause the processor to carry out the following:

acquiring, from the head bone parameters, a bone parameter of at least one head bone associated with the bone parameter adjustment information; and adjusting, according to the bone parameter adjustment information, the bone parameter of the at least one head bone.

19. The apparatus according to claim 17, wherein:

in acquiring the bone parameter adjustment information for the target three-dimensional human face model, the instructions, when being executed by the processor, cause the processor to carry out the following:

receiving a bone parameter adjustment instruction; and determining, according to the bone parameter adjustment instruction, the bone parameter adjustment information, and in determining, according to the bone parameter adjustment instruction, the bone parameter adjustment information, the instructions, when being executed by the processor, cause the processor to carry out the following:

acquiring a change quantity output by a control, wherein the control is configured for the bone parameter adjustment instruction; and determining, according to the outputted change quantity, the bone parameter adjustment information.

20. A non-transitory computer-readable storage medium having stored thereon computer programs that, when being executed by a computer, cause the computer to carry out the following:

acquiring first bone parameters and first blend deformation data corresponding to a preset three-dimensional virtual object model comprising a plurality of bones, the first blend deformation data indicating a degree of deformation of the preset three-dimensional virtual object;

acquiring second bone parameters corresponding to a target three-dimensional virtual object model, and determining a transformation relationship of the second bone parameters with the first bone parameters; and determining second blend deformation data corresponding to the target three-dimensional virtual object model, according to the transformation relationship of the second bone parameters with the first bone parameters, and the first blend deformation data.

\* \* \* \* \*